United States Patent
Khurshid et al.

(10) Patent No.: US 11,477,244 B2
(45) Date of Patent: Oct. 18, 2022

(54) METHOD AND SYSTEM FOR DATA LOSS PREVENTION MANAGEMENT

(71) Applicant: SAUDI ARABIAN OIL COMPANY, Dhahran (SA)

(72) Inventors: Rafiq Ajmal Khurshid, Dhahran (SA); Saad Farhan Al-Anazi, Dhahran (SA); Abdullah Tariq Al-Essa, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 72 days.

(21) Appl. No.: 16/880,314

(22) Filed: May 21, 2020

(65) Prior Publication Data

US 2021/0367976 A1 Nov. 25, 2021

(51) Int. Cl.
*H04L 9/40* (2022.01)
*H04L 41/22* (2022.01)
(Continued)

(52) U.S. Cl.
CPC .............. *H04L 63/20* (2013.01); *H04L 41/22* (2013.01); *H04L 45/42* (2013.01); *H04L 63/105* (2013.01);
(Continued)

(58) Field of Classification Search
None
See application file for complete search history.

(56) References Cited

U.S. PATENT DOCUMENTS 7,996,374 B1 8/2011 Jones et al.
9,300,693 B1 * 3/2016 Manmohan ......... G06F 9/45558
(Continued)

FOREIGN PATENT DOCUMENTS

EP 2348448 A1 7/2011
KR 20130085505 A 7/2013

OTHER PUBLICATIONS

International Search Report issued in corresponding International Application No. PCT/US2020/039580, dated Jan. 22, 2021 (3 pages).
Written Opinion issued in corresponding International Application No. PCT/US2020/039580, dated Jan. 22, 2021 (6 pages).

*Primary Examiner* — Kevin T Bates
*Assistant Examiner* — Emad Siddiqi
(74) *Attorney, Agent, or Firm* — Osha Bergman Watanabe & Burton LLP (57) ABSTRACT

A method may include obtaining, from a user device, a first feedback from a first predetermined party regarding a data loss prevention (DLP) event through a graphical user interface (GUI). The method may further include determining whether the DLP event is authorized using the first feedback. The method may further include transmitting, automatically in response to determining that the DLP event is not authorized, a request for a second feedback by a second predetermined party using the GUI. The second predetermined party may be selected for the request automatically according to a routing queue. The method may further include obtaining, in response to transmitting the request for the second feedback, a selection of a security action regarding the DLP event using the GUI. The method may further include transmitting, automatically in response to the selection of the security action, a command that initiates the security action.

17 Claims, 6 Drawing Sheets

(51) Int. Cl.
 *H04L 45/42* (2022.01)
 *H04L 67/06* (2022.01)
 *H04L 67/1097* (2022.01)

(52) U.S. Cl.
 CPC ...... *H04L 63/1416* (2013.01); *H04L 63/1433* (2013.01); *H04L 67/06* (2013.01); *H04L 67/1097* (2013.01)

(56) References Cited

U.S. PATENT DOCUMENTS

| | | | |
|---|---|---|---|
| 10,467,426 | B1 | 11/2019 | Esposito et al. |
| 2007/0162973 | A1* | 7/2007 | Schneier .............. G06F 21/552 726/22 |
| 2012/0246303 | A1 | 9/2012 | Petersen et al. |
| 2013/0291087 | A1 | 10/2013 | Kailash et al. |
| 2016/0323243 | A1 | 11/2016 | LeVasseur et al. |
| 2017/0329972 | A1* | 11/2017 | Brisebois .............. G06F 21/577 |
| 2018/0183827 | A1 | 6/2018 | Zorlular et al. |
| 2019/0012456 | A1 | 1/2019 | Moore et al. |
| 2019/0132351 | A1 | 5/2019 | Linde et al. |
| 2019/0260785 | A1 | 8/2019 | Jenkinson et al. |

* cited by examiner

METHOD AND SYSTEM FOR DATA LOSS PREVENTION MANAGEMENT

BACKGROUND

Cybersecurity may include the protection of an organization's data from both outside threats as well as individuals within an organization that may compromise the data. Accordingly, many organizations use various investigative entities to identify and review data transfers that may violate one or more security policies.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor and from a first user device, a first feedback from a first predetermined party regarding a data loss prevention (DLP) event through a graphical user interface (GUI). The DLP event corresponds to a transfer of a data file by a second user device within a network. The method further includes determining, by the computer processor, whether the DLP event is authorized using the first feedback. The method further includes transmitting, by the computer processor and automatically in response to determining that the DLP event is not authorized, a request for a second feedback by a second predetermined party using the GUI. The second predetermined party is selected for the request automatically according to a routing queue. The method further includes obtaining, by the computer processor and in response to transmitting the request for the second feedback, a selection of a security action regarding the DLP event using the GUI. The method further includes transmitting, by the computer processor and automatically in response to the selection of the security action, a command that initiates the security action.

In general, in one aspect, embodiments relate to a system that includes various network elements and a first user device coupled to the network elements. The system further includes a second user device coupled to the network elements. The system further includes a data loss prevention (DLP) manager that includes a computer processor. The DLP manager is coupled to the first user device, the second user device, and the network elements. The DLP manager obtains, from the first user device, a first feedback from a first predetermined party regarding a DLP event through a graphical user interface (GUI). The DLP event corresponds to a transfer of a data file by the second user device. The DLP managers determines whether the DLP event is authorized using the first feedback. The DLP manager transmits, automatically in response to determining that the first DLP event is not authorized, a request for a second feedback by a second predetermined party using the GUI. The second predetermined party is selected for the request automatically according to a routing queue. The DLP manager obtains, in response to transmitting the request for the second feedback, a selection of a security action regarding the DLP event using the GUI. The DLP manager transmits, automatically in response to the selection of the security action, a command that initiates the security action.

In general, in one aspect, embodiments relate to a non-transitory computer readable medium storing instructions executable by a computer processor. The instructions obtain, from a first user device, a first feedback from a first predetermined party regarding a data loss prevention (DLP) event through a graphical user interface (GUI). The DLP event corresponds to a transfer of a data file by a second user device. The instructions determine whether the DLP event is authorized using the first feedback. The instructions transmit, automatically in response to determining that the first DLP event is not authorized, a request for a second feedback by a second predetermined party using the GUI. The second predetermined party is selected for the request automatically according to a routing queue. The instructions obtain, in response to transmitting the request for the second feedback, a selection of a security action regarding the DLP event using the GUI. The instructions transmit, automatically in response to the selection of the security action, a command that initiates the security action.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a routing queue to transmit automatically requests to review a data loss protection (DLP) event to multiple parties. In particular, multiple security policies may govern the internal transmission of data within a network as well as communicating the data to parties outside the network. Thus, a specific data transmission may be a possible violation of one or more security policies, which may necessitate a review of the data transmission to confirm the existence of a violation. This potential violation may be referred to as a DLP event. As such, a DLP manager may provide a centralized dashboard for both collecting feedback from various reviewing parties as well as transmitting requests for feedback within a predetermine routing queue. After one party provides feedback within a graphical user interface, the DLP manager may contact the next party in the routing queue. The routing queue may define the sequence that different parties provide feedback regarding a DLP event. Based on the requested feedback, a different party may be selected for reviewing the DLP event based on the routing queue. Thus, the DLP manager may expedite an incident investigation of a DLP event by organizing an online review involving multiple stakeholders within an organization. Accordingly, the DLP manager may automatically manage approval of various actions regarding the DLP event as well as the transmission of various reports associated with the DLP event.

Figure 1:
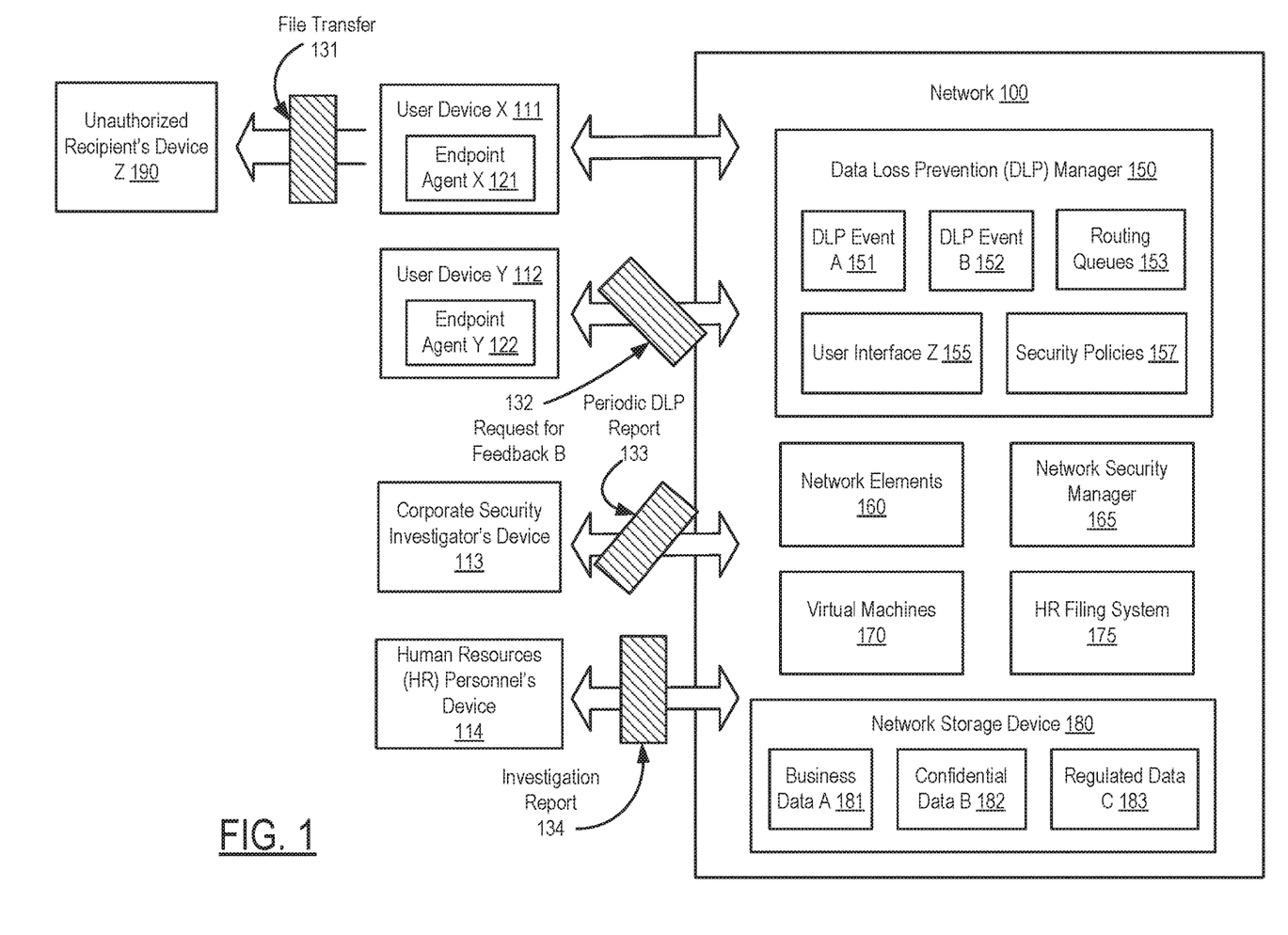
FIGS. 1 and 2 show systems in accordance with one or more embodiments.

Turning to FIG. 1, FIG. 1 shows a schematic diagram in accordance with one or more embodiments. As shown in FIG. 1, a network (e.g., network (100)) may be connected to various user devices (e.g., user device X (111), user device Y (112), corporate security investigator's device (113), an HR personnel's device (114)). In particular, the network (100) may include a data loss prevention (DLP) manager (e.g., DLP manager (150)), a network security manager (e.g., network security manager (165)), an HR filing system (e.g., HR filing system (175)), a network storage device (e.g., network storage device (180)), various virtual machines (e.g., virtual machines (170)), various network elements (e.g., network elements (160)) and/or user equipment (not shown). A network element may refer to various hardware components within a network, such as switches, routers, hubs, user equipment, or any other logical entities for uniting one or more physical devices on the network. User devices may include personal computers, smartphones, human machine interfaces, and any other devices coupled to a network that obtain inputs from one or more users. The network security manager (165) may include hardware and/or software that includes functionality for determining and/or remediating network vulnerabilities, such as performing antivirus scans, defending against cyberattacks, etc. Network elements (160), the DLP manager (150), user equipment, user devices, the network security manager (165), the HR filing system (175), and/or the network storage device (180) may be computing systems similar to the computing system (600) described in FIGS. 6A and 6B, and the accompanying description.

Turning to the DLP manager, a DLP manager may include hardware and/or software to identify and/or protect sensitive data. As such, a DLP manager may include functionality to ensure sensitive data is not lost, misused, and/or accessed by unauthorized users. For example, a DLP manager may classify data coupled to a network as being regulated data (e.g., regulated data C (183)), confidential data (e.g., confidential data B (182)), and/or business data (e.g., business data A (181)). Based on a particular data classification, a DLP manager may further identify violations of security policies (e.g., security policies (157)) defined by various organizations. More specifically, a security policy may correspond to a regulatory compliance requirement, such as those issued by Health Insurance Portability and Accountability Act (HIPAA), Payment Card Industry Data Security Standard (PCI-DSS), or General Data Protection Regulation (GDPR). As an example, access to regulated data C (183) may include medical records, where usage of the medical records is limited by governmental regulations.

Once a potential DLP violation is identified, a DLP manager may include hardware and/or software to perform various security actions such as transmitting alerts, performing encryption, locking files and/or devices, and other actions to prevent end users from accidentally or maliciously sharing protected data. In some embodiments, the DLP manager includes hardware and/or software to monitor and control endpoint activities, filter data streams on a network, and/or monitor data in a cloud computing environment to protect data at rest, in motion, and/or in use.

In some embodiments, a DLP manager detects a DLP event (e.g., DLP event A (151), DLP event B (152)) based on access by a user device (e.g., user device X (111)) to predetermined data that corresponds to one or more security policies. As shown in FIG. 1, for example, the DLP event A (151) may correspond to the user device X (111) performing a file transfer (131) to an unauthorized recipient's device Z (190) that may violate a security policy. After determining the possibility of a DLP event, the DLP manager (150) may include functionality to determine a routing queue (e.g., a routing queue among the routing queues (153)) that causes the DLP event to be reviewed by one or more parties for analysis. In particular, the routing queue may be a static queue that defines a predetermined order or sequence that DLP messages are transmitted to various parties. In some embodiments, the routing queue is a dynamic queue, where the order of parties changes based on feedback by one or more parties within the routing queue. Likewise, the routing queue may a lookup table or a list that identifies users, user accounts, user devices, email addresses, and/or other user information that enables the DLP manager to contact a respective party in a routing queue. For more information on routing queues, see Block 330 in FIG. 3 below and the accompanying description.

Keeping with FIG. 1, in response to determining a DLP event, a DLP manager may transmit one or more requests for feedback (e.g., request for feedback B (132)) to one or more user devices (e.g., user device Y (112)) based on a routing queue. A request for feedback may be a data message (e.g., an email, an instant message, or a prompt within a user interface) to access a server or host for reviewing one or more DLP events. In particular, detecting a DLP event may not necessarily correspond to a violation of a security policy. For example, the DLP event may be a false positive or an authorized data transmission governed by an exception, as well as an unauthorized disclosure outside a network. As such, a request for feedback may transmitted to various parties to confirm an actual violation, such as a DLP investigator, a member of corporate security, human resources entity, an organization's disciplinary body, etc. Accordingly, the feedback from a party may designate a DLP event as being a false positive, authorized, or an unauthorized disclosure. Likewise, the feedback may also request the DLP event be escalated to another party for further reviewing or to provide additional information regarding the DLP event.

In some embodiments, a DLP manager includes a user interface (e.g., user interface Z (155)). In particular, the DLP manager may include hardware and/or software that provides a user interface to various user devices over a network or in a cloud computing environment. In particular, the user interface may provide parties with the capability to review DLP events and/or respond to requests for feedback in a centralized location. A user interface may be hardware and/or software that includes functionality for presenting data and/or receiving inputs from a user regarding DLP events and/or security actions in response to the DLP events. For example, a DLP manager may include software to provide a graphical user interface for presenting data and/or receiving commands to initiate security actions.

Figure 2:
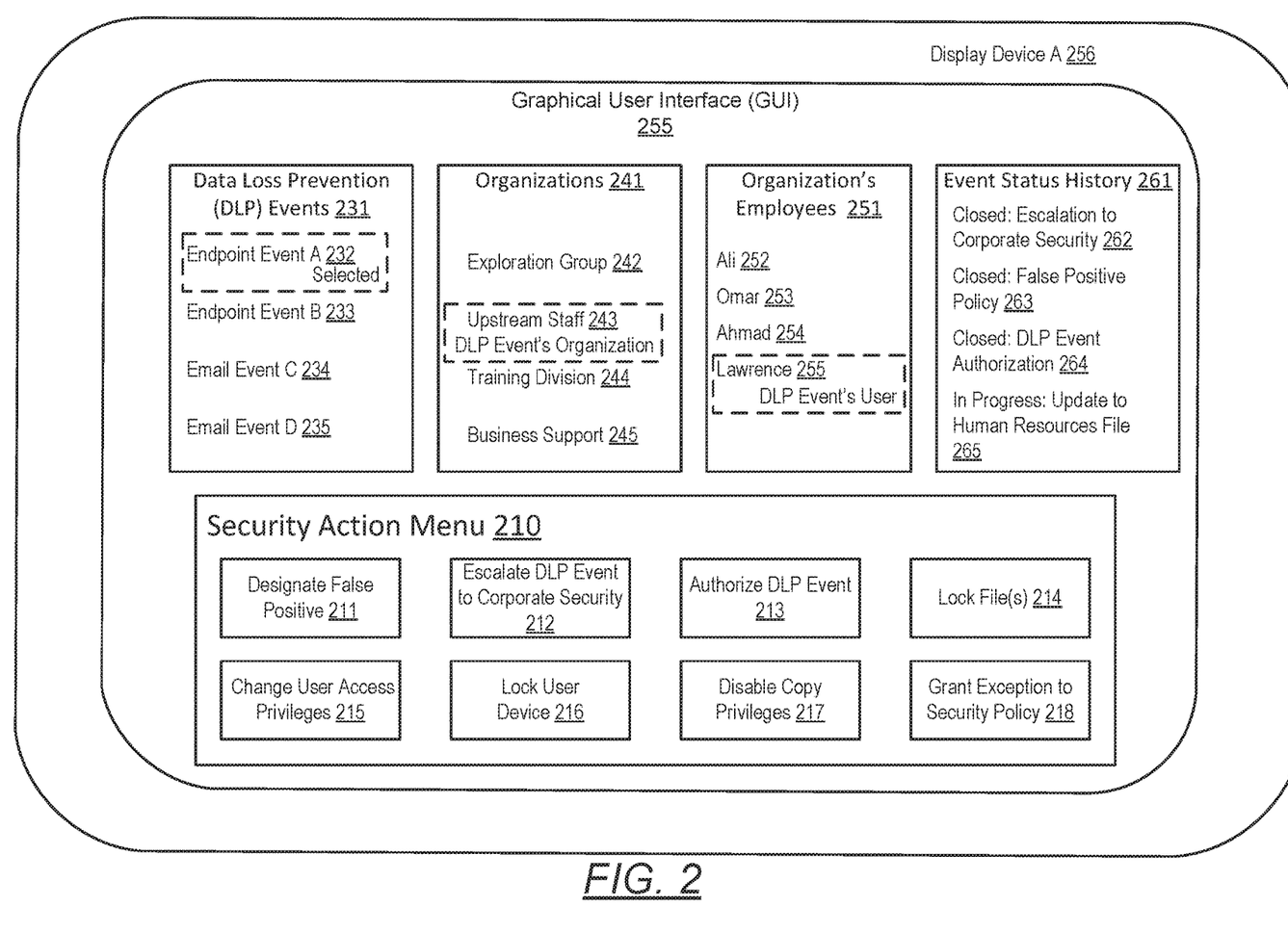

Turning to FIG. 2, FIG. 2 illustrates an example of reviewing DLP events through a user interface in accordance with one or more embodiments. In FIG. 2, a graphical user interface (GUI) (255) is provided on a display device A (256). As shown, the GUI (255) may provide information regarding various DLP events (231), such as an endpoint event A (232), an endpoint event B (233), an email event C (234), or an email event D (235). Endpoint events may refer to DLP events associated with a data transmission from an endpoint, e.g., a USB transfer, while email events may refer to DLP events that include a data transmission sent by email. For example, a user may receive a request for feedback through the GUI (255) regarding the DLP events (232, 233, 234, 235). Accordingly, the GUI (255) may illustrate various organizations (241) (e.g., exploration group (242), upstream staff (243), training division (244), and business support (245)) as well as the organization's employees (251) (e.g., Ali (252), Omar (253), Ahmad (254), Lawrence (255)) that may be associated with a respective DLP event. Likewise, the GUI (255) may also include the event status history (261) for a respective DLP event. In some embodiments, the reviewer may also select one or more options from a security action menu (210) based on review of the endpoint event A (232). For example, the security action menu (210) may be a GUI window that automatically provides various security action options based on the type of reviewer, the type of DLP event, and/or the event status history (261). For example, security actions may include designating a false positive (211), escalating the DLP event to corporate security (212), authorizing the DLP event (213), locking one or more files (214), changing user access privileges (215), locking a user device (216), disabling copying privileges (217), or granting exception to a security policy (218).

Keeping with FIG. 2, a reviewer selects endpoint event A (232) for review. Among the organizations (241), endpoint event A (232) is associated with upstream staff (243) and a particular DLP event's user, Lawrence (255). Based on previous feedback submitted regarding endpoint event A (232), various matters have been closed, such as escalation to corporate security (262), a false positive policy (263), and the DLP event authorization (264). Accordingly, in FIG. 2, the only remaining matter in progress for endpoint event A (232) is an update (265) to the human resources file for Lawrence (255).

Returning to FIG. 1, a DLP manager includes functionality for generating one or more reports based on DLP events. For example, a request for feedback may include a report (e.g., investigation report (134)) regarding a pending DLP event, such as a report describing event status history as well as feedback from one or more previous parties regarding a particular DLP event. In some embodiment, the DLP manager may also provide one or more reports within a GUI. Thus, the DLP manager may provide real-time reporting of DLP events to organization managers and investigators with customized reporting functions to enable review of DLP events.

In some embodiments, the DLP manager is coupled to an HR filing system (e.g., HR filing system (175)). For example, the DLP manager may provide investigative reviewers with functionality for reading sensitive outbound data in association with respective employee profile data obtained from the HR filing system. In particular, the DLP manager may identify a department's security analyst based on the employee responsible for a DLP event. In an investigative report, the report may display relevant DLP event elements such as sender information, the sender's organization, subject title of a DLP event, a classification of the transmitted data, the type of document(s) transmitted, recipient information of the document, the source location of the document, and the destination location of the document.

In some embodiments, the DLP manager generates periodic reports. For example, a periodic report may describe DLP events for a particular employee, a particular organization, and/or different types of DLP events over a predetermined time period. In regard to FIG. 2, for example, a DLP manager may generate a report regarding pending DLP events for the exploration group (242) that require feedback regarding whether the pending DLP events are false positives. Such DLP periodic reports may be provided to user devices through a dashboard integration to a DLP manager's user interface.

In some embodiments, a DLP report is an executive DLP report. For example, an executive DLP report may provide a summary that includes a count of DLP events and statistics for one or more managing parties. A customized DLP report may enable a managing party to receive insight into their organization's security risks and an individual employee's behavior in handling sensitive data. In another embodiment, an executive DLP report may show an organization's DLP outbound sensitive report results with respect to emails, USB devices, and/or printing jobs. With respect to email results, the executive DLP report may include information regarding individual email addresses and destination email domains with regards to the email platform, such as to provide a department head with insight of outbound traffic from a network or user device. An executive DLP report may also include emails trends, such as a particular trend of DLP events for the past 3 months in order to monitor the overall cybersecurity stage and maturity of an organization. The executive DLP report may include exposure of data through various distribution channels such as email, web access, etc. An executive DLP report may also include a comparison between a particular month's results and an average for a predetermined time period. An executive DLP report may also include USB trends and printing trends. In some embodiments, a DLP manager generates key performance indicator (KPI) reports that include a specialized summary of email outbound traffic of sensitive data, a number of unauthorized DLP events based on specific organizations for specify security policy and time period, a total number of unauthorized DLP events.

In some embodiments, the DLP manager communicates with endpoint agents (e.g., endpoint agent X (121), endpoint agent Y (122)) to determine the existence of a DLP event. For example, an endpoint agent may include hardware and/or software installed on a user device that may include functionality for monitoring data received and/or transmitted by the user device. As such, endpoint agents may monitor and/or control email and instant messaging communications before the communicated messages reach a central archive. Endpoint agents may also control access to user devices, such as through locking data files, software applications, and respective user devices. In particular, "locking" may refer to limiting a portion or all functionality regarding a particular hardware or software component or otherwise making the hardware or software component inaccessible to a particular user. In some embodiments, a DLP manager may monitor data at various network egress points near the perimeter of a network to analyze network traffic. By monitoring network traffic, a DLP manager may detect transmission of sensitive data that may be in violation of one or more security policies.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
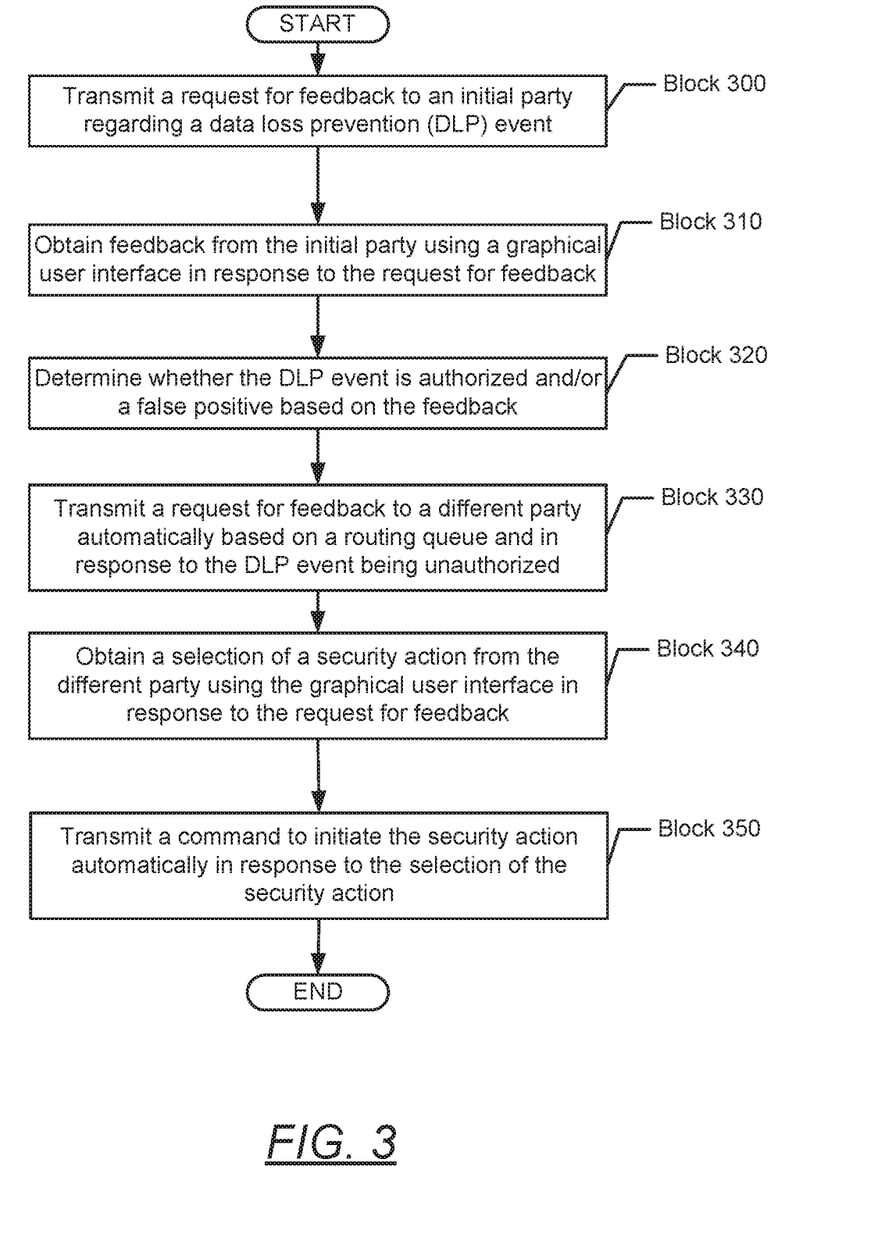
FIG. 3 shows a flowchart in accordance with one or more embodiments.

Turning to FIG. 3, FIG. 3 shows a flowchart in accordance with one or more embodiments. Specifically, FIG. 3 describes a general method for automatically routing a DLP event to multiple parties. One or more blocks in FIG. 3 may be performed by one or more components (e.g., DLP manager (150)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a request for feedback is transmitted to an initial party regarding a DLP event in accordance with one or more embodiments. For example, after a DLP manager detects a DLP event, the DLP manager may forward a request for feedback regarding the DLP event to an initial human reviewer. In particular, the DLP manager may determine the employee responsible for the DLP event based on identifying the user device and/or user account associated with the DLP event. For example, the DLP event may be routed automatically to a member of an incident response team of a potential violator of a security policy. The incident response team may be a role defined by a particular organization for reviewing DLP events for assessment and recommendations. The request for feedback may be similar to the request for feedback B (132) described above in FIG. 1 and the accompanying description.

In some embodiments, the employee associated with a DLP event may be identified from an HR filing system. Using employee information, for example, the DLP manager may determine the initial party responsible for reviewing the DLP event, e.g., the employee's supervisor, a cybersecurity investigator, etc. In some embodiments, a DLP manager may automatically route the DLP event to a predetermined party after determining that the DLP event is not a false positive.

In Block 310, feedback is obtained from an initial party using a graphical user interface in response to a request for feedback in accordance with one or more embodiments. After receiving a request for feedback, an initial party may access a graphical user interface provide by a DLP manager. For example, the initial party may be assigned the task of identifying whether the DLP event is a false positive and/or authorized by an exception to a security policy. In particular, the initial party may enter comments or remarks into the graphical user interface that may be reviewed by the next party reviewing the DLP event. Likewise, the feedback may be some action performed by the DLP manager, such as escalating the DLP event to a different party or performing a particular security action.

In Block 320, a determination is made whether a DLP event is authorized and/or a false positive based on feedback in accordance with one or more embodiments. More specifically, if the DLP is a false positive or authorized, review of the DLP event may be terminated as no security policy violation occurred. This determination may be made by one or more parties as well as automatically by the DLP manager. In some embodiments, the initial party submits the feedback that describes whether the DLP event is a false positive or authorized by an exception to a security policy. For example, the initial party may select a particular exception from a drop-down menu that is associated with an employee's information. Likewise, the DLP event may be forwarded to one or more additional parties with requests for additional feedback prior to determining whether the DLP event is a false positive or authorized. In some embodiments, the DLP manager analyzes feedback from one or more parties to determine whether the DLP event is a false positive or authorized.

In Block 330, a request for feedback is transmitted to a different party automatically based on a routing queue and in response to a DLP event being unauthorized in accordance with one or more embodiments. After completion of an assessment by the initial party, the DLP manager may automatically route the DLP event details to one or more parties, such as an organization head of DLP policy, another investigative reviewer, one or more members of corporate security, and/or a person from human resources, for review and approval of one or more proposed actions. Where a DLP event is escalated to corporate security, one or more corporate security investigators may conduct a formal investigation into the DLP event. In particular, different parties may have different security actions available for disposing of a DLP event. Where a cybersecurity investigator may be able to forward the DLP event to an employee's supervisor for discipline by the organization, a corporate security investigator may be able to initiate harsher security actions, such as limiting data access, locking user devices, and/or locking individual files.

Likewise, the request for feedback may be transmitted with a report based on previous feedback regarding the DLP event. As such, the request for feedback may ask a different party to review comments or remarks provided in the previous feedback as well as make any additional changes to the report. The request may also include a timeline for responding to the request, e.g., by tomorrow morning.

Figure 4:
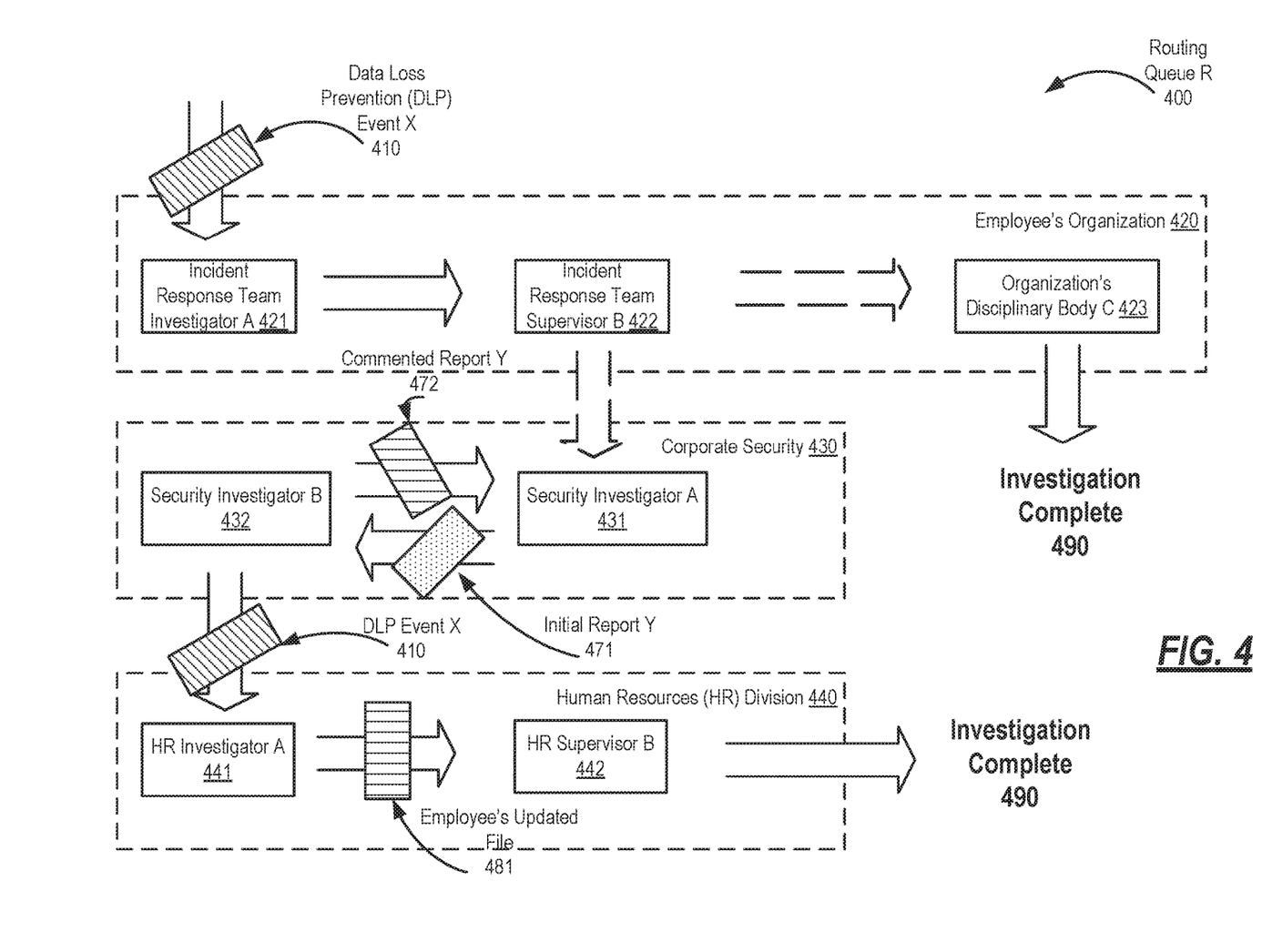
FIG. 4 shows an example in accordance with one or more embodiments.

Turning to FIG. 4, FIG. 4 provides an example of a routing queue in accordance with one or more embodiments. The following example is for explanatory purposes only and not intended to limit the scope of the disclosed technology. In FIG. 4, a routing queue R (400) describes the path of a DLP event X (410) through multiple shareholders within an organization, i.e., the employee's organization (420), corporate security (430), and a human resources division (440). Initially, the DLP event X (410) is reviewed by an incident response team (IRT) investigator A (421). The IRT investigator A (421) determines whether the DLP event X (410) is a false positive or authorized by a preexisting exception. However, the IRT investigator A (421) determines that the DLP event X (410) is an unauthorized data transfer accordingly. After the IRT investigator A (421) provides comments regarding the DLP event X (410) to a DLP manager (not shown), the DLP manager determines that an IRT supervisor B (422) is the next party within the routing queue R (400). As such, a request for feedback is sent to the IRT supervisor B (422) to review DLP event X (410) as well as IRT investigator A's comments. Here, the IRT supervisor B (422) has the option to forward the DLP event X (410) to the organization's disciplinary body C (423) and subsequently end the routing queue R (400) by completing the investigation (i.e., investigation complete (490)). The IRT supervisor B (422) also has the option to escalate the DLP event X (410) to corporate security (430) for further consideration. Ultimately, the IRT supervisor B (422) selects a security action using the DLP manager that forwards the DLP event X (410) to security investigator A (431) from corporate security (430).

Keeping with FIG. 4, the security investigator A (431) initiates a detailed investigation into DLP event X (410) after receiving a request for feedback from the IRT supervisor B (422). The security investigator A (431) prepares an initial report Y (471) based on DLP event X (410) that is forwarded automatically to security investigator B (432). After reviewing the initial report Y (471) from security investigator A (431), security investigator B (432) has several questions that he believes require further investigation. Accordingly, the DLP manager forwards a commented report Y (472) back to security investigator A (431) to address the inquiry by security investigator B (432).

After the security investigator B (432) signing off on a final report, a DLP manager automatically forwards the DLP event X (410) to the HR division (440). At the HR division (440), HR investigator A (441) reviews DLP event X (410) and updates the employee's personnel file (i.e., employee's updated file (481)). The DLP manager automatically forwards the updated file (481) to HR supervisor B (442) that proceeds to approve the updated file (481). Accordingly, the routing queue R (400) ends with the investigation complete (490). Therefore, as shown in FIG. 4, a routing queue may provide an intelligent approach to transmitting multiple reports, multiple files, and multiples requests for information in an automated fashion to multiple parties within an organization. The routing queue may also remove the requirement that each party independently know the next party in the routing queue, as the DLP manager may be responsible for storing contact information. Likewise, during the routing queue R (400), multiple security actions may be performed by parties within the routing queue that may limit cybersecurity exposure by the DLP event X (410) to various organizations.

Returning to FIG. 3, in Block 340, a selection of a security action is obtained from a different party using a graphical user interface in response to a request for feedback in accordance with one or more embodiments. In particular, a party may select a security action within a GUI provided by a DLP manager. Examples of security actions may include changing user access rights within a network, locking a user device, locking one or more files within a user device, and/or various other DLP enforcement operations.

In Block 350, a command to initiate a security action is transmitted automatically in response to a selection of the security action in accordance with one or more embodiments. Once a DLP manager obtains a selection of a security action, the DLP manager may transmit a command to a user device and/or a network element to implement the security action. For example, the command may be transmitted to an endpoint agent on a user device, where the endpoint agent implements one or more security actions in response to the command.

Figure 5:
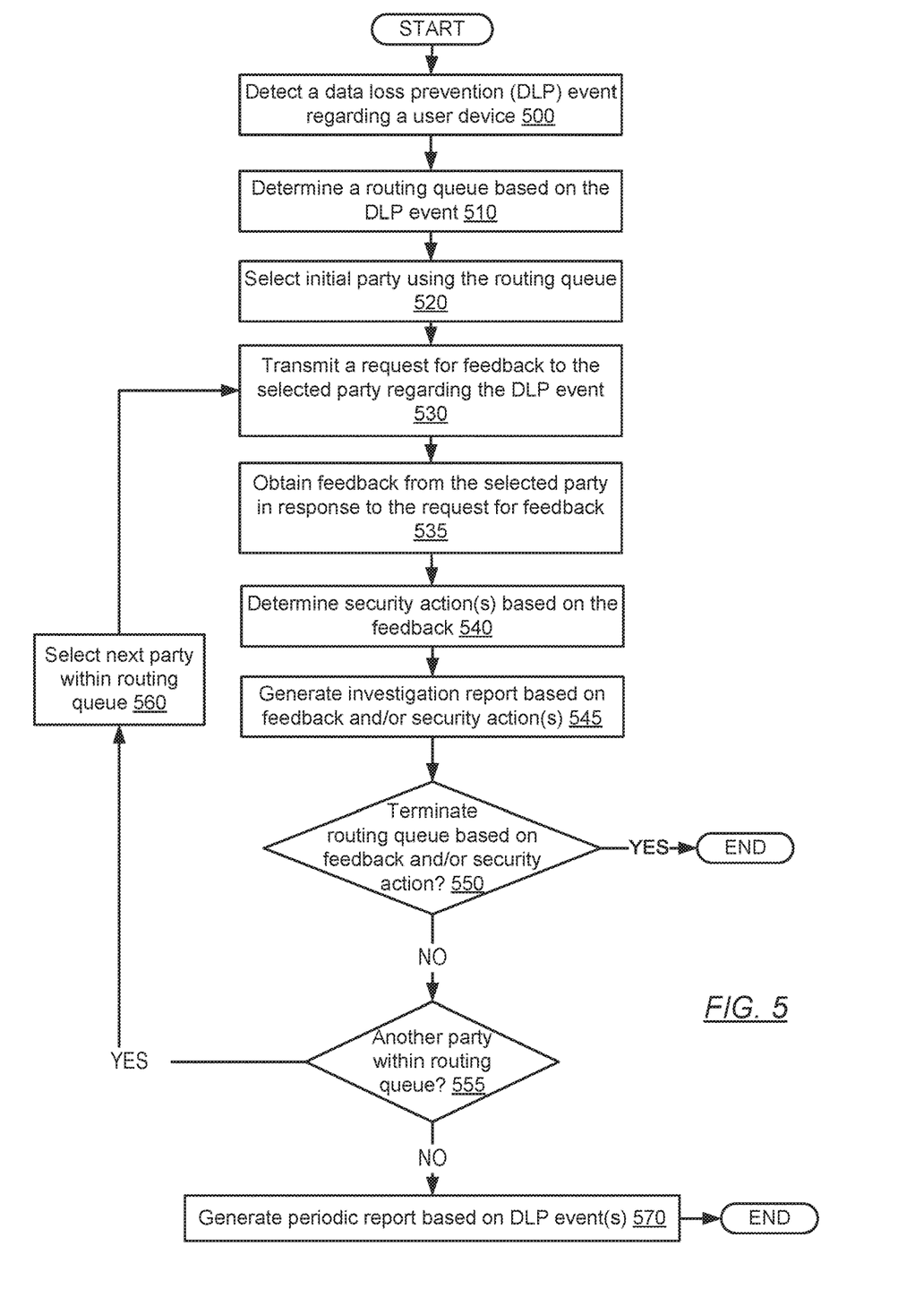
FIG. 5 shows a flowchart in accordance with one or more embodiments.

Turning to FIG. 5, FIG. 5 shows a flowchart in accordance with one or more embodiments. Specifically, FIG. 5 describes a specific method for managing one or more DLP events using a routing queue. One or more blocks in FIG. 5 may be performed by one or more components (e.g., DLP manager (150)) as described in FIGS. 1 and 2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a DLP event is detected regarding a user device in accordance with one or more embodiments. For example, the presence of a DLP event may be determined based on monitoring network traffic from/to a user device. Likewise, a DLP manager may also communicate with an endpoint agent on a user device in order to obtain a notification of the DLP event. For more information on DLP events, see FIG. 1 above and the accompanying description.

In Block 510, a routing queue is determined based on a DLP event in accordance with one or more embodiments. For example, a DLP manager may automatically determine a routing queue based on user information associated with the DLP event, such as which organization includes a respective employee associated with the DLP event, the type of possible DLP violation (e.g., whether the DLP violation is directed to business trade secrets or regulatory data that may trigger criminal sanctions), whether the DLP event is a repeated violation or only a first offense, etc. In some embodiments, multiple routing queues are preprogrammed and the DLP manager automatically selects one of the preprogrammed routing queues. The routing queue may be similar to the routing queues (153) described above FIG. 1 and/or the routing queue R (400) described above in FIG. 4 and the accompanying description.

In Block 520, an initial party is selected using a routing queue in accordance with one or more embodiments. In particular, a routing queue may have an identifiable initial party that is assigned to provide initial feedback for the DLP event. For example, the initial party may be an incident response investigator associated with a particular type of DLP event or the organization of an employee associated with the DLP event. However, other embodiments are contemplated for selecting the initial party such as current availability of various investigators, conflict of interests between a respective employee, as well as the severity of the DLP event.

In Block 530, a request for feedback is transmitted to a selected party regarding a DLP event in accordance with one or more embodiments. Block 530 may be similar to Block 300 described above in FIG. 3 and the accompanying description.

In Block 535, feedback is obtained from a selected party in response to a request for feedback in accordance with one or more embodiments. Block 535 may be similar to Block 310 described above in FIG. 3 and the accompanying description.

In Block 540, one or more security actions are determined based on feedback in accordance with one or more embodiments. Block 535 may be similar to Block 340 described above in FIG. 3 and the accompanying description.

In Block 545, an investigation report is generated based on feedback and/or one or more security actions in accordance with one or more embodiments. Throughout a routing queue, for example, one or more reports may be transmitted and/or revised to various parties along with requests for feedback. Thus, a request for feedback may include both a request to review a particular DLP event as well as the previous comments of one or more parties that previously reviewed the DLP event. Likewise, different reports may be stored in different databases for different departments. For example, a DLP investigations report may be stored in a database for an organization's corporate security department, which may be automatically routed to an organization head and personnel department for further action. In addition, a similar investigation report may be electronically submitted to an HR's filing system as part of an employee's electronic file.

In Block 550, a routing queue is terminated based on feedback and/or a security action in accordance with one or more embodiments. In particular, various actions by parties within a routing queue may terminate the routing queue, e.g., where an investigation is complete, a final report is approved, or a party determines that the DLP event is best handled with an employee's respective organization. Where a determination is made to terminate a routing queue, the process shown in FIG. 5 may end. Otherwise, the process may proceed to Block 555.

In Block 555, a determination is made whether to select another party within a routing queue in accordance with one or more embodiments. For example, the DLP manager may proceed iteratively in transmitting requests for feedback regarding a DLP event to multiple parties. After each party provides feedback, the DLP manager may proceed to contact the next party within a routing queue. In some embodiments, the DLP manager analyzes feedback from one or more parties to determine if a different party should be selected next in the routing queue, e.g., where a dynamic routing queue is used. For example, based on feedback, one or more parties may be added or removed from the routing queue. Where another party is in the routing queue, the process may proceed to Block 560. Where no more parties are located in the routing queue, the process may proceed to Block 570.

In Block 560, a next party is selected within a routing queue in accordance with one or more embodiments. The next party may be selected iteratively, for example, or based on previous feedback, such as where an action escalates a DLP event to corporate security.

In Block 570, a periodic report is generated based on one or more DLP events in accordance with one or more embodiments. In some embodiments, DLP reports are generated for various security policies, organizations, periods of time, and/or keywords. Examples of periodic reports may include executive DLP reports, KPI reports, real-time reports, etc. In particular, a DLP monthly report may be automatically transmitted to various parties by a DLP manager that describes data disclosed outside of an organization's network that has been classified as confidential or regulatory data encompassed by one or more security policies. The DLP report may capture exposure of data through various distribution channels such as email, web, flash USB, external hard drives and/or local printers.

Figure 6A:
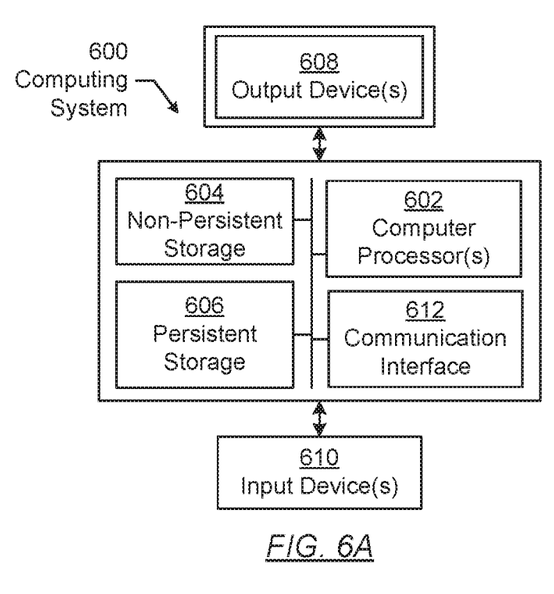
FIGS. 6A and 6B show a computing system in accordance with one or more embodiments.

Embodiments may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
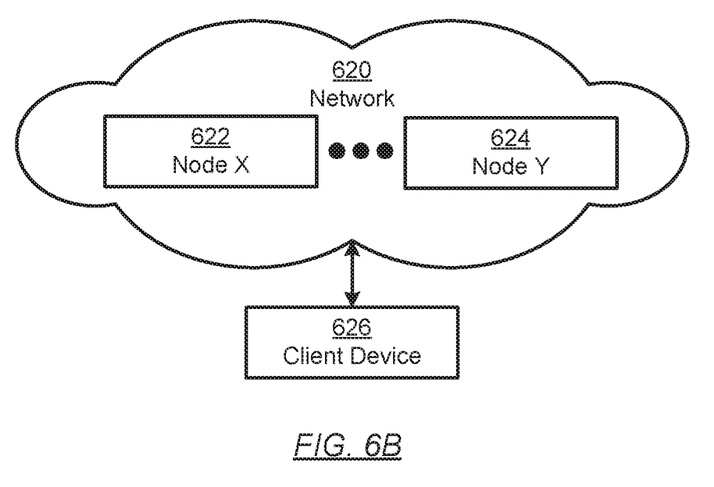

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
obtaining, by a computer processor and from a first user device, a first feedback from a first predetermined party regarding a first data loss prevention (DLP) event through a graphical user interface (GUI), wherein the first DLP event corresponds to a transfer of a data file by a second user device within a network;
determining, by the computer processor, whether the first DLP event is authorized using the first feedback;
transmitting, by the computer processor and automatically in response to determining that the first DLP event is not authorized, a request for a second feedback by a second predetermined party using the GUI, wherein the second predetermined party is selected for the request automatically according to a first routing queue;

obtaining, by the computer processor and in response to transmitting the request for the second feedback, a selection of a security action regarding the first DLP event using the GUI;

transmitting, by the computer processor and automatically in response to the selection of the security action, a command that initiates the security action;

detecting a second DLP event by a DLP manager, wherein the DLP manager is a cloud server that provides the graphical user interface to a first plurality of predetermined parties with a second routing queue;

transmitting, by the DLP manager and based on the second routing queue, a request for a third feedback regarding the second DLP event to a third predetermined party among the first plurality of parties; and obtaining, by the DLP manager, the third feedback from the third predetermined party, wherein the third feedback corresponds to whether the second DLP event is a false positive, wherein the second routing queue is terminated in response to the DLP manager determining that the second DLP event is a false positive.

2. The method of claim 1, further comprising:
determining a predetermined organization associated with the first user device, wherein the first routing queue is determined among a plurality of routing queues based on the predetermined organization, and wherein the first routing queue automatically transmits a plurality of requests for feedback regarding the first DLP event to a second plurality of predetermined parties using the GUI.

3. The method of claim 1,
wherein the second user device comprises an endpoint agent that monitors data that is accessed by the second user device based on a first security policy, and wherein the endpoint agent transmits a DLP message to a DLP manager in response to detecting a second file transfer regarding data that corresponds to the first security policy.

4. The method of claim 1,
wherein the command is transmitted to the second user device, and wherein the security action causes the data file on the second user device to be inaccessible until a DLP manager unlocks the data file.

5. The method of claim 1, further comprising:
determining a plurality of DLP events corresponding to unauthorized disclosures by email outside the network, determining a portion of the plurality of DLP events that correspond to a predetermined organization; and generating a report for a predetermined time period using the portion of the plurality of DLP events.

6. The method of claim 1,
wherein the first predetermined party is a cybersecurity investigator, and wherein the second predetermined party is a human resources (HR) entity.

7. A system, comprising:
a plurality of network elements;
a first user device coupled to the plurality of network elements;
a second user device coupled to the plurality of network elements; and
a data loss prevention (DLP) manager comprising a computer processor, wherein the DLP manager is coupled to the first user device, the second user device, and the plurality of network elements, and wherein the DLP manager comprises functionality for:

obtaining, from the first user device, a first feedback from a first predetermined party regarding a first DLP event through a graphical user interface (GUI), wherein the first DLP event corresponds to a transfer of a data file by the second user device;

determining whether the first DLP event is authorized using the first feedback;

transmitting, automatically in response to determining that the first DLP event is not authorized, a request for a second feedback by a second predetermined party using the GUI, wherein the second predetermined party is selected for the request automatically according to a first routing queue;

obtaining, in response to transmitting the request for the second feedback, a selection of a security action regarding the first DLP event using the GUI; and transmitting, automatically in response to the selection of the security action, a command that initiates the security action;

detecting a second DLP event by a DLP manager, wherein the DLP manager is a cloud server that provides the graphical user interface to a first plurality of predetermined parties with a second routing queue;

transmitting, by the DLP manager and based on the second routing queue, a request for a third feedback regarding the second DLP event to a third predetermined party among the first plurality of parties; and obtaining, by the DLP manager, the third feedback from the third predetermined party, wherein the third feedback corresponds to whether the second DLP event is a false positive, wherein the second routing queue is terminated in response to the DLP manager determining that the second DLP event is a false positive.

8. The system of claim 7, wherein the DLP manager further comprises functionality for:
determining a predetermined organization associated with the first user device, wherein the first routing queue is determined among a plurality of routing queues based on the predetermined organization, and wherein the first routing queue automatically transmits a plurality of requests for feedback regarding the first DLP event to a second plurality of predetermined parties using the GUI.

9. The system of claim 7,
wherein the second user device comprises an endpoint agent that monitors data that is accessed by the second user device based on a first security policy, and wherein the endpoint agent transmits a DLP message to a DLP manager in response to detecting a second file transfer regarding data that corresponds to the first security policy.

10. The system of claim 7,
wherein the command is transmitted to the second user device, and wherein the security action causes the data file on the second user device to be inaccessible until a DLP manager unlocks the data file.

11. The system of claim 7, wherein the DLP manager further comprises functionality for:
determining a plurality of DLP events corresponding to unauthorized disclosures by email outside a network, determining a portion of the plurality of DLP events that correspond to a predetermined organization; and generating a report for a predetermined time period using the portion of the plurality of DLP events.

12. The system of claim 7, wherein the first predetermined party is a cybersecurity investigator, and wherein the second predetermined party is a human resources (HR) entity.

13. A non-transitory computer readable medium storing instructions executable by a computer processor, the instructions comprising functionality for:

obtaining, from a first user device, a first feedback from a first predetermined party regarding a first data loss prevention (DLP) event through a graphical user interface (GUI), wherein the first DLP event corresponds to a transfer of a data file by a second user device within a network;

determining whether the first DLP event is authorized using the first feedback;

transmitting, automatically in response to determining that the first DLP event is not authorized, a request for a second feedback by a second predetermined party using the GUI, wherein the second predetermined party is selected for the request automatically according to a first routing queue;

obtaining, in response to transmitting the request for the second feedback, a selection of a security action regarding the first DLP event using the GUI; and transmitting, automatically in response to the selection of the security action, a command that initiates the security action;

detecting a second DLP event by a DLP manager, wherein the DLP manager is a cloud server that provides the graphical user interface to a first plurality of predetermined parties with a second routing queue;

transmitting, by the DLP manager and based on the second routing queue, a request for a third feedback regarding the second DLP event to a third predetermined party among the first plurality of parties; and obtaining, by the DLP manager, the third feedback from the third predetermined party, wherein the third feedback corresponds to whether the second DLP event is a false positive, wherein the second routing queue is terminated in response to the DLP manager determining that the second DLP event is a false positive.

14. The non-transitory computer readable medium of claim 13, wherein the instructions further comprise functionality for:

determining a predetermined organization associated with the first user device, wherein the first routing queue is determined among a plurality of routing queues based on the predetermined organization, and wherein the first routing queue automatically transmits a plurality of requests for feedback regarding the first DLP event to a second plurality of predetermined parties using the GUI.

15. The non-transitory computer readable medium of claim 13, wherein the second user device comprises an endpoint agent that monitors data that is accessed by the second user device based on a first security policy, and wherein the endpoint agent transmits a DLP message to a DLP manager in response to detecting a second file transfer regarding data that corresponds to the first security policy.

16. The non-transitory computer readable medium of claim 13, wherein the command is transmitted to the second user device, and wherein the security action causes the data file on the second user device to be inaccessible until a DLP manager unlocks the data file.

17. The non-transitory computer readable medium of claim 13, wherein the instructions further comprise functionality for:

determining a plurality of DLP events corresponding to unauthorized disclosures by email outside the network, determining a portion of the plurality of DLP events that correspond to a predetermined organization; and generating a report for a predetermined time period using the portion of the plurality of DLP events.

* * * * *